(12) United States Patent
Frerichs et al.

(10) Patent No.: US 6,533,338 B1
(45) Date of Patent: Mar. 18, 2003

(54) VERTICAL ARM FLAT FLOOR EXTENSION AND VERTICAL ARM HOUSING

(75) Inventors: Marc Edward Frerichs, Davenport, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 09/682,820

(22) Filed: Oct. 22, 2001

(51) Int. Cl.[7] .................................................. B60P 3/34
(52) U.S. Cl. .............................. 296/26.14; 296/26.12; 296/26.15
(58) Field of Search ................................ 296/165, 171, 296/175, 26.09, 26.02, 26.1, 26.12, 26.13, 26.14, 176, 26.15; 52/64, 67

(56) References Cited

U.S. PATENT DOCUMENTS

| | | | |
|---|---|---|---|
| 5,491,933 A | | 2/1996 | Miller et al. |
| 5,560,667 A | * | 10/1996 | Edry .......................... 296/26.12 |
| 5,772,270 A | * | 6/1998 | Hanser et al. ............. 296/26.02 |
| 5,815,988 A | * | 10/1998 | Molina ............................. 52/67 |
| 5,908,215 A | * | 6/1999 | Hanser et al. ............. 296/26.12 |
| 5,971,471 A | * | 10/1999 | Gardner ..................... 296/26.13 |
| 6,052,952 A | | 4/2000 | Frerichs et al. |
| 6,067,756 A | | 5/2000 | Frerichs et al. |
| 6,402,216 B1 | * | 6/2002 | McManus et al. ........ 296/26.14 |

* cited by examiner

Primary Examiner—D. Glenn Dayoan
Assistant Examiner—Jason Morrow
(74) Attorney, Agent, or Firm—James C. Nemmers; Douglas J. Stilwell (57) ABSTRACT

A cammed vertical arm support system is described for the support and control of an expandable room that may be moved between a retracted position within a vehicle to an expanded position outward from the vehicle. The cammed relationship allows the room floor to lie above and generally parallel with the vehicle floor when the room is retracted and beside and generally flush with the vehicle floor when the room is extended. A moveable housing to conceal vertical arms is also disclosed.

16 Claims, 7 Drawing Sheets

VERTICAL ARM FLAT FLOOR EXTENSION AND VERTICAL ARM HOUSING

BACKGROUND OF THE INVENTION

The invention is for use in connection with vehicles of the type that have an expandable room. An example of such a vehicle with an expandable room is shown in Hanser U.S. Pat. No. 6,067,756. Recreational and similar vehicles have been known and used for years for traveling, camping and other purposes and also have been used as multiple purpose vehicles that permit individuals to be transported and to live for short periods of time in the vehicles. Because these vehicles are driven over public highways, there are limitations on the widths of the vehicles, and such limitations restrict the amount of interior room that is available for occupancy or storage when the vehicle is parked off the road. To overcome these limitations and to provide more useable living space when the vehicle is parked, there have been designed expandable rooms that can be extended while the vehicle is parked and retracted while the vehicle is moving over the road. Such expandable rooms greatly improve the utility of the vehicles for not only recreational purposes, but also for use in transporting small groups, such as entertainers, who spend a considerable amount of time on the road and move from location to location frequently. Some of these vehicles are quite luxurious, so in addition to the maximization of available space, aesthetics are very important.

Since the expandable rooms are quite massive, the mechanism for expanding them and then retracting them requires a considerable amount of power. Typically, expansion and retraction is accomplished using hydraulic power since most of these vehicles have hydraulic systems available for other purposes. Most known systems therefore use hydraulic cylinders to expand and retract the room, but known systems are designed in such a way that the cylinders and the associated components occupy valuable space and therefore take away from otherwise useable space. HWH Corporation has pioneered a number of extension systems that are economical regarding the use of vehicle space. One such system is a vertical cam system wherein arms that extend upwardly from a floor surface are pivotally mounted to the floor and pivotally mounted to one another. In such an arrangement, a hydraulic cylinder is used to change the relative positions of the arms and to force the extendible room to move inwardly or outwardly from a vehicle. Such a vertical cam system may be conveniently located within the arm of a sofa, or within other accessories built into the expandable room. In this manner, the extension functionality may be provided without sacrificing space that is otherwise needed for storage, occupancy, or comfort.

With such a system, or with various other room extension systems, there has been a difference in the height of the vehicle floor and the extendible room floor. Such a step-up may be undesirable for some vehicle occupants. There is therefore a need for improved mechanisms for accomplishing the expansion and retraction of expandable rooms in an efficient manner with a minimum of space required for the hydraulic mechanisms and with a flat-floor extended room position. There is also a need for providing such mechanisms that can be hidden from view by moveable housings and thus greatly improve the overall appearance of these vehicles to make them more appealing to users.

SUMMARY OF THE INVENTION

The mechanism of the invention for extending and retracting expandable rooms in vehicles employs a tension cable and cammed vertical arms wherein a first arm is pivotally anchored to a vehicle and pivotally combined in nested relationship with a second arm that is pivotally anchored to an expandable room. A track is mounted to the vehicle to allow support of the expandable room at a point distant from the anchor of the second arm. The track includes a downward turn near the vehicle side wall. In this manner, extension of the cylinder forces the arms apart and forces the expandable room to move along the track and down. To allow a flat floor configuration, the arms are combined, in cammed relationship so that as the floor of the expandable room moves through its range of motion, the arms continue to provide support and the cable remains under tension.

A further improvement, that may be employed with vertical arm extensions of the flat floor or the previously described traditional or "raised floor" variety, is a moveable housing. If a vertical cam arm or hydraulic cylinder is visible from the vehicle interior, it is desirable to cover such elements to minimize the possibility of damage, contact, or contamination between the vehicle occupants and the mechanism. Such covers also serve to promote vehicle aesthetics. Therefore, there is disclosed a moveable cover for use in attachment with the moveable arms of the vertical cam mechanism to provide a cover for components that may otherwise protrude into the vehicle interior when the room is extended.

DETAILED DESCRIPTION

Figure 1:
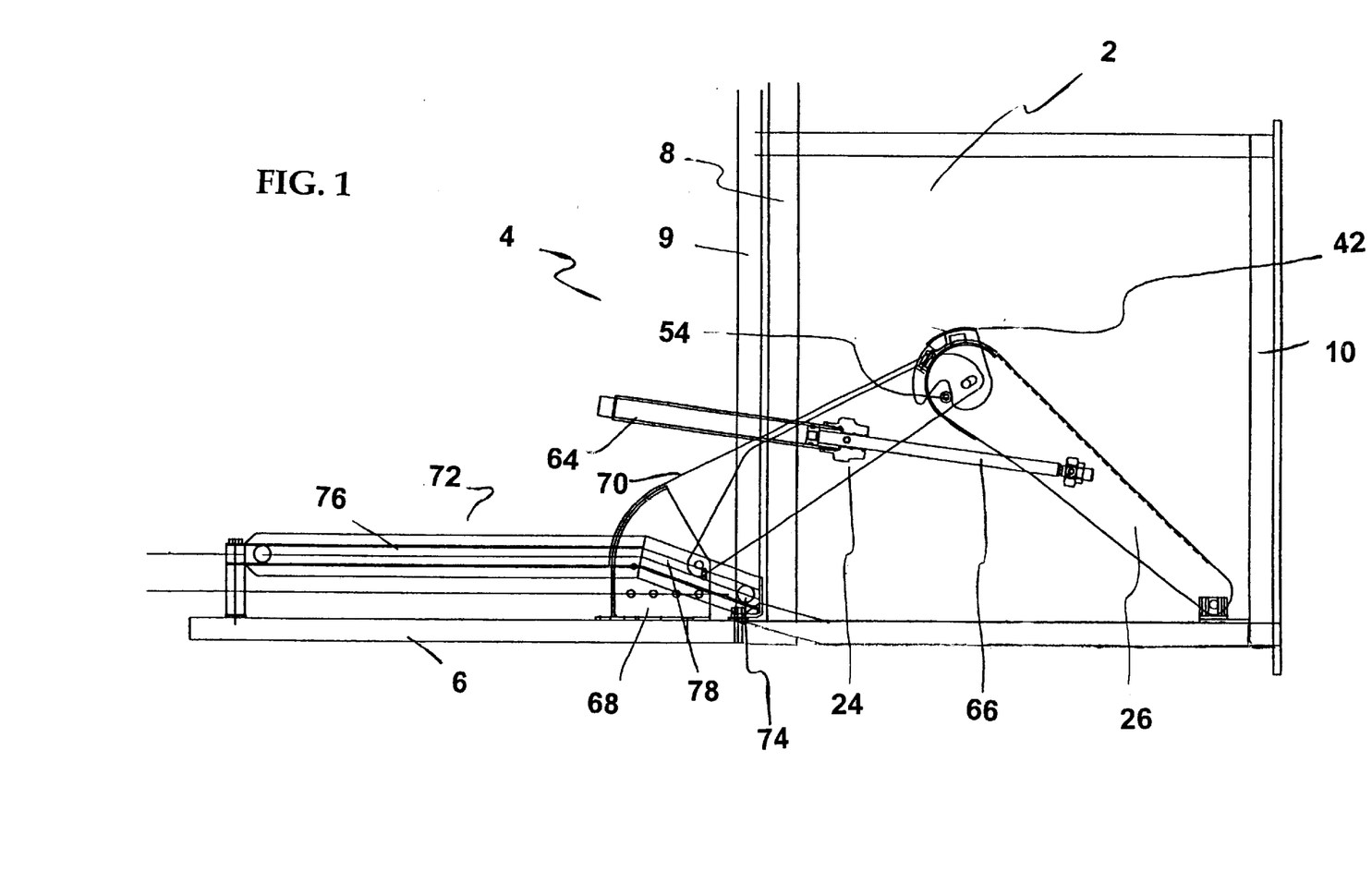
FIG. 1 is a side elevation view that illustrates the vertical arm flat floor extension mechanism in the environment of an extended room.
Figure 2:
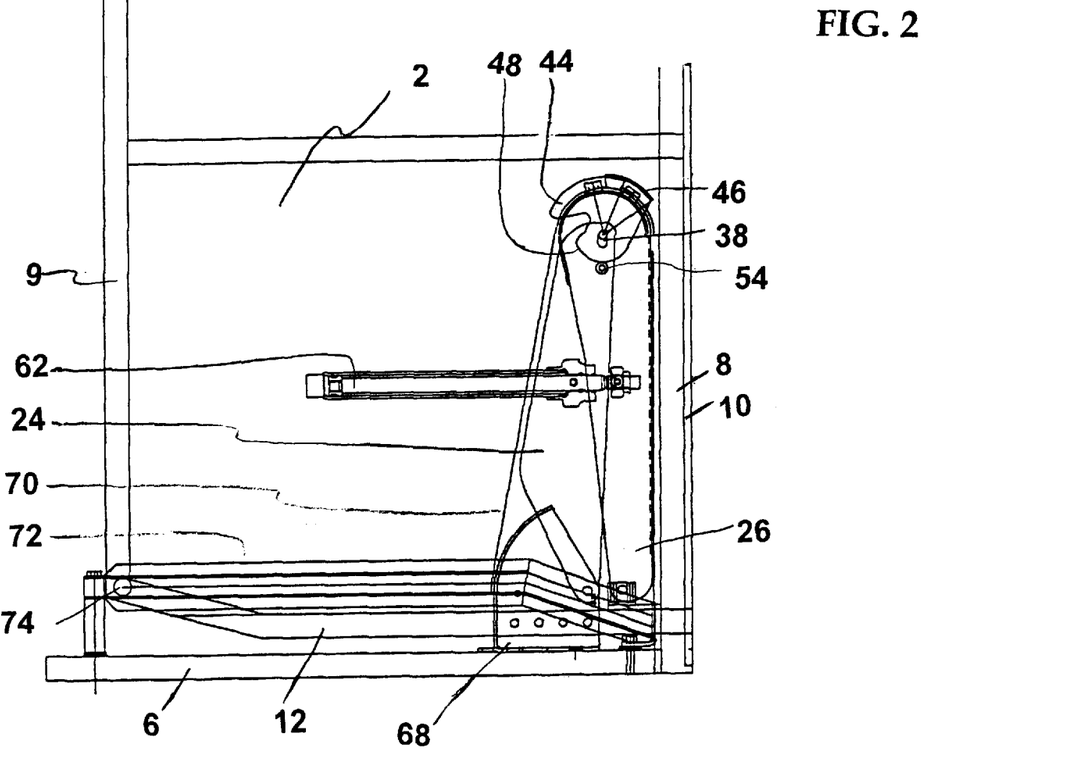
FIG. 2 is a side elevation view that illustrates the vertical arm flat floor extension mechanism in the environment of a retracted room.

Referring now to the drawings, and particularly to FIGS. 1 and 2, vehicles of this type have an expandable room indicated generally by the reference numeral 2 that may be moved between a retracted and expanded position relative to a vehicle 4. The vehicle 4 is illustrated with reference to a vehicle floor member 6 and a vehicle side wall member 8.

The expandable room 2 is characterized as shown by interior 9 and exterior 10 room side wall members, and a room floor member 12. In some applications it may be desired to use floor members 12 that are segmented and pivotal in one direction to allow the floor to flex during extension and retraction.

Figure 3:
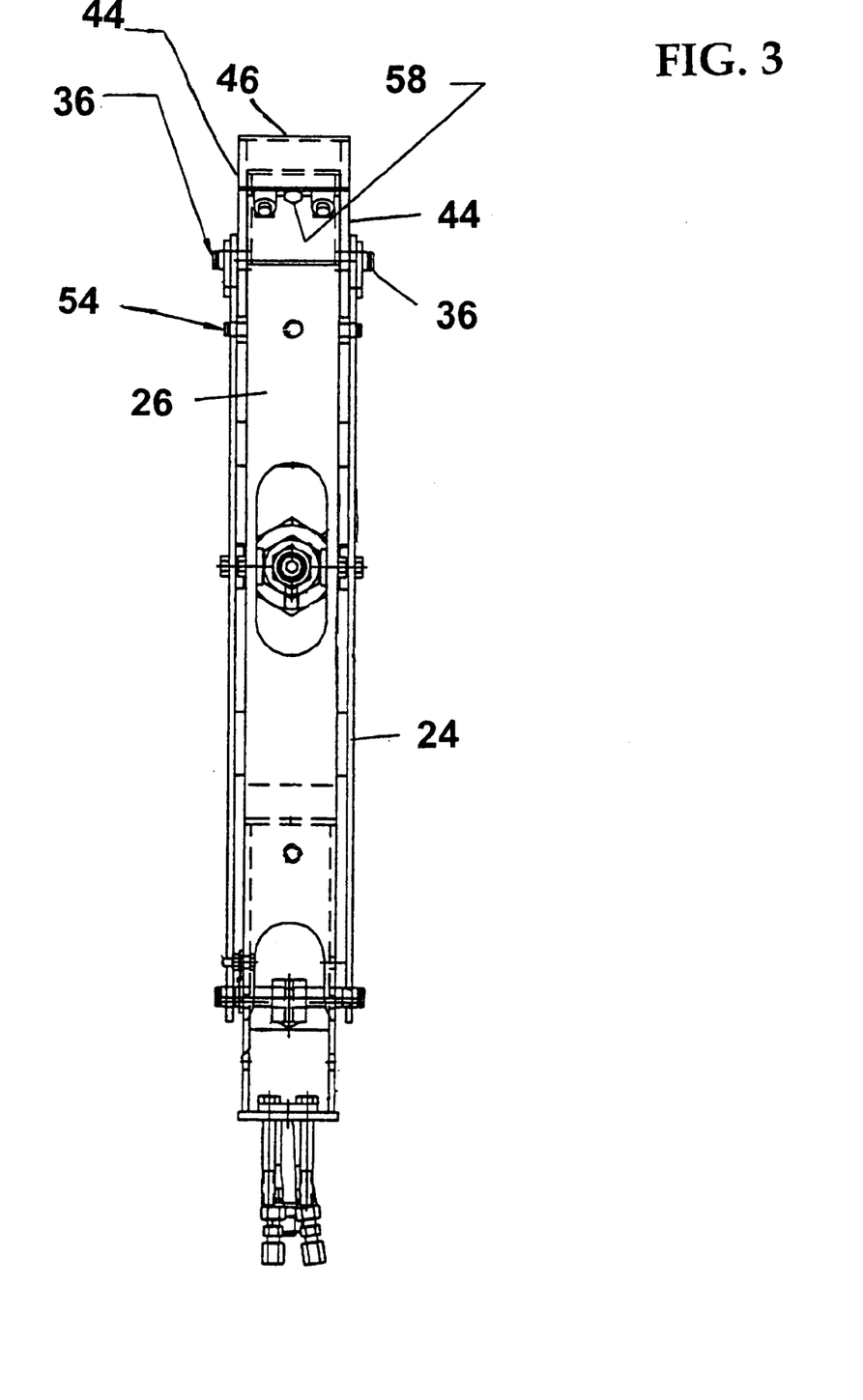
FIG. 3 is an end view of a vertical arm that illustrates the nested arms and endcaps.
Figure 4:
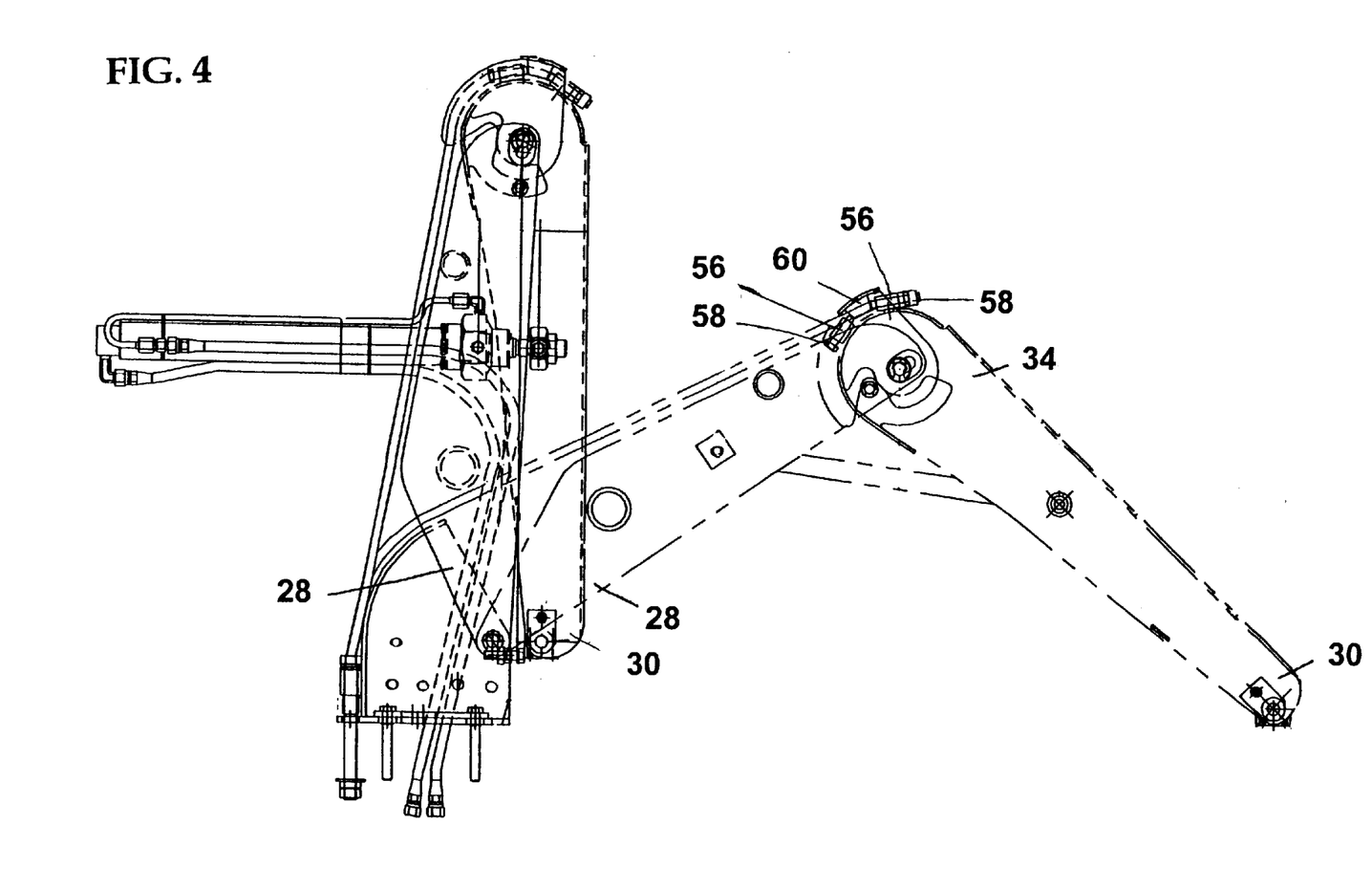
FIG. 4 is a detailed side elevation view of the vertical arm in an extended and retracted position.
Figure 5:
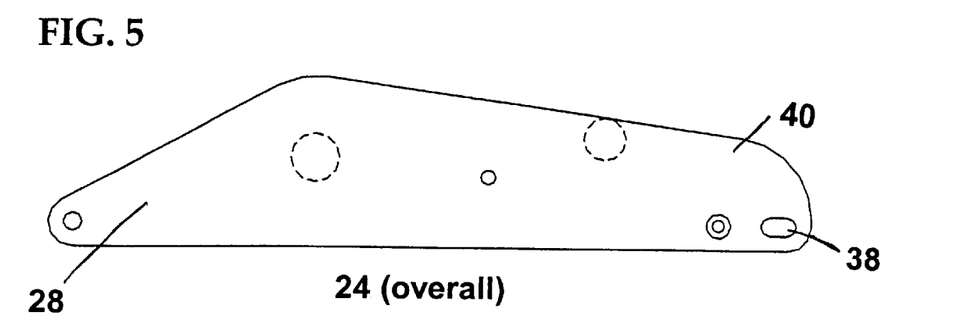
FIG. 5 is a detailed side elevation view of the outer arm.

Moveable arm members are provided in a nested arrangement, as illustrated in FIG. 3 so that there is a first arm member (shown herein as an outer arm member 24) and a second arm member (shown herein as an inner arm member 26). The outer arm member 24 angles generally upwardly from a pivotal attachment at its lower end 28 with an anchor 68 connected to the vehicle 4. The inner arm member 26 angles generally upwardly from a pivotal attachment at its lower end 30 with the expandable room 2. The inner arm member 26 has an inner arm pivot pin opening 32 formed therein generally near the inner arm member 26 upper end 34. A pivot pin 36 extends through the inner arm pivot pin opening 32. The outer arm member 24 has an elongated opening 38 formed therein generally near the outer arm member 24 upper end 40 as best illustrated in FIG. 5. The elongated opening 38 is generally aligned with the inner arm pivot pin opening 32 and the pivot pin 36 extends therethrough. The pivot pin 36 is slideable within the elongated opening 38 and the inner arm member 26 is similarly slideable relative to an outer arm member 24.

Figure 6:
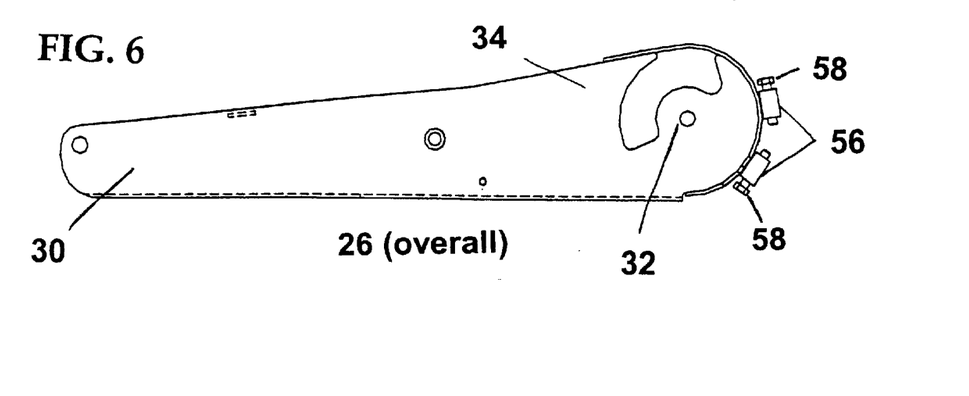
FIG. 6 is a detailed side elevation view of the inner arm.
Figure 7:
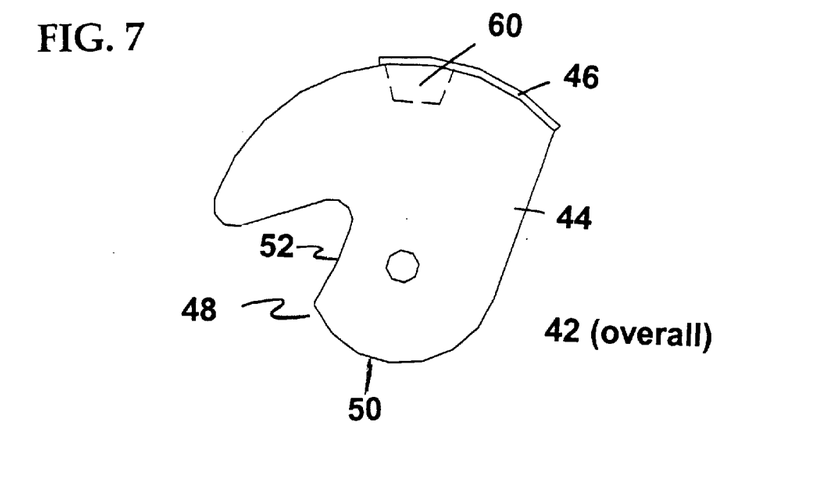
FIG. 7 is a detailed side elevation view of the end cap.

A vertical arm end cap 42 is journalled upon the pivot pin 36 between the inner arm member 26 and the outer arm member 24. The end cap 42 comprises two parallel side walls 44 and an end wall 46 extending therebetween. The end cap side walls 44 have a cam surface 48 thereon as best illustrated in FIG. 7. The cam surface 48 comprises a cam surface room upright portion 50 and a cam surface room drop portion 52 portion. An arm member bearing or roller 54 attached to the outer arm member 24 extends from the outer arm member 24 and engages the cam surface 48 of the end cap 42. The arm member bearing or roller 54 carries a vertical load that is communicated through the pivot pin 36 and the end cap 42. Because the inner arm member 24 not only pivots away from or towards the outer arm member 24, but also shifts relative to the outer arm member 24 as the room is lowered to or raised from its fully extended position, the pivot pin shifts within the outer arm member elongated opening 38. The contours of the cam surface 48 comprising the cam surface room upright portion 50 and the cam surface room drop portion 52 allow the vertical load to be communicated to the outer arm member 24 through the arm member roller or bearing 54 throughout this range of motion. The inner arm member 26 is contoured or cut-away to allow sufficient clearance for the movement of the cam 54 upon the end cap cam surface 48. This feature of the preferred inner arm member 24 is best illustrated in FIG. 6.

The inner arm member 26 upper end 34 has disposed thereon adjusters such as two bolt housings 56 that anchor adjustable bolts 58. The bolts extend from the bolt housings towards an end cap stop 60. Through adjustment of the bolts, the position of the end cap relative to the inner arm member 26 may be adjusted and the vertical drop associated with movement of the bearing or roller 54 upon the cam surface 48 may be controlled.

A hydraulic cylinder 62 is disposed between the arms 24, 26 so that a rod end of the cylinder body 64 is pivotally mounted to one arm and the exterior end of the hydraulic cylinder rod 66 is pivotally mounted to the other arm. Although hydraulic cylinders are the preferred force assist means, other means such as electric drivers, pneumatic or even manual systems may be employed, consistent with the present invention. The outer arm is pivotally mounted to the vehicle 4 through an anchor block 68 that also anchors lines such as wires, chains, or cables that serve as tension lines cables 70 that extend along the outer arm member 24 and are further anchored to the inner arm 26. The elongated opening 38 of the outer arm member 24 allows the cable to remain under tension as the extendible room moves from its extended to retracted position. At least one cable anchor is adjustable in embodiments wherein the vertical drop of the flat floor extendible room is subject to adjustment.

A track 72 is provided at a position above the vehicle floor member 6. The track, receives a guide such as a bearing or roller 74 that is mounted to the expandable room, for example to a wall member 9, and that is moveable through the track 72. A track first portion 76 is generally parallel with the vehicle floor. A track second portion 78 turns downward preferably near the vehicle side wall member 8.

Figure 8:
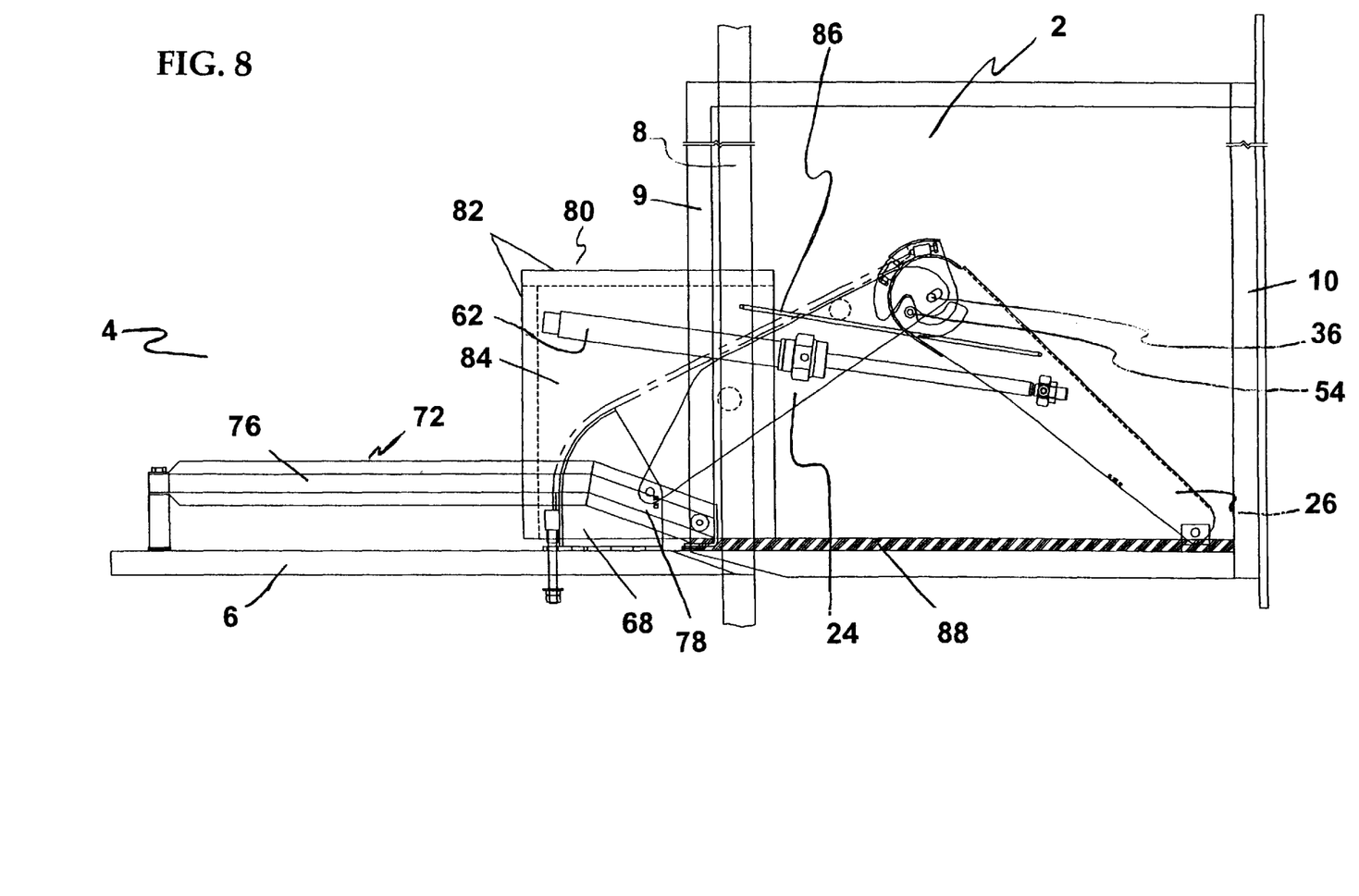
FIG. 8 is a side elevation view that illustrates the vertical arm flat floor extension mechanism in the environment of an extended room with a moveable housing covering a portion of the mechanism.
Figure 9:
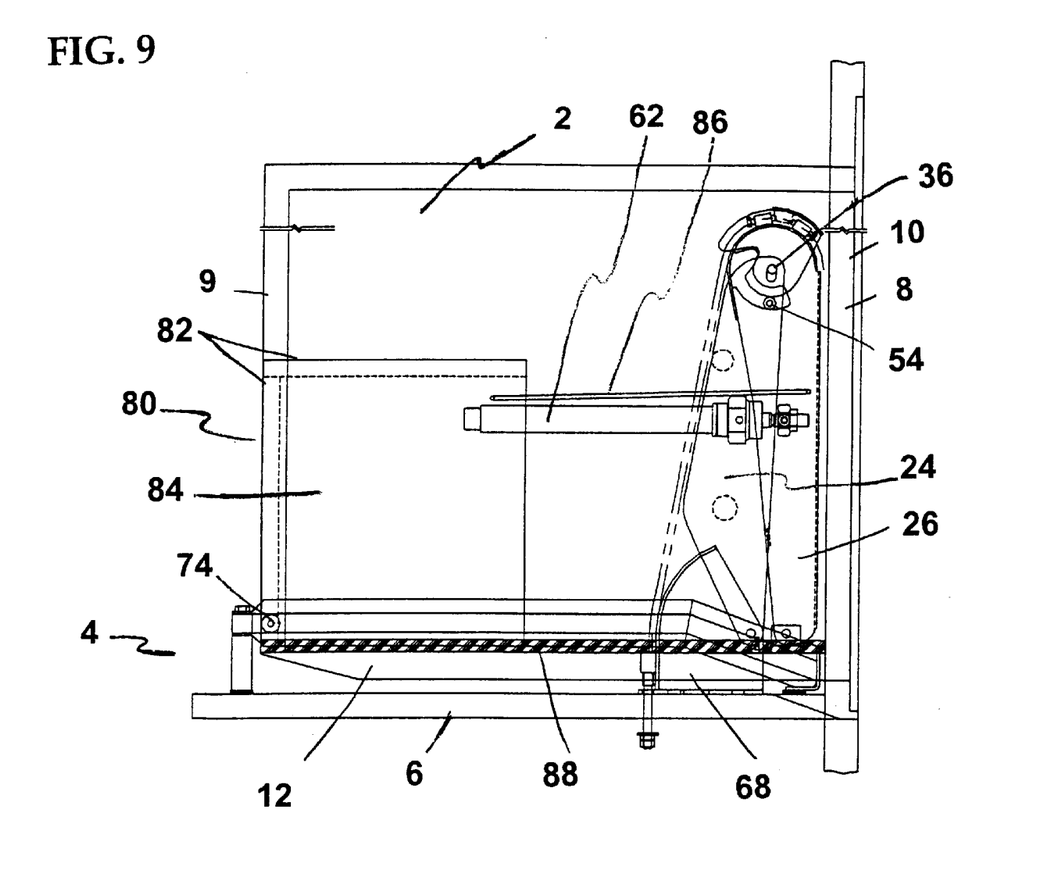
FIG. 9 is a side elevation view that illustrates the vertical arm flat floor extension mechanism in the environment of a retracted room with a moveable housing covering a portion of the mechanism.

FIGS. 8 and 9 illustrate a moveable housing 80 comprising a housing end wall 82 and two generally parallel housing side walls 84. The housing is positioned to be moveable generally over the outer arm member 24 and cylinder 62. A pivotally attached control bar 86 extends between the housing 80 and the inner arm member 26. The control bar 86 causes the housing 80 to be pulled generally outward as the room 2 extends, and pushed generally inwardly as the room 2 retracts. The moveable housing 80 may be used in combination with a vertical cam system not configured to produce a flat floor or with the presently described vertical cam flat floor. The housing 80 rides upon a low friction support 88 that is moveable relative to the vehicle 4 with the expandable room 2. In vertical cam-flat floor configurations, the low friction support 88 is preferably fixed relative to the expandable room floor members 12. In traditional or raised vertical cam configurations, the low friction support is preferably fixed relative to the vehicle floor members 6.

Having disclosed the, structure of the described invention, its operation is as follows. When the room 2 is in the retracted position (as illustrated in FIGS. 2 and 9), actuation of the retracted hydraulic cylinder or other force assist means 62 causes the point of pivotal attachment between the hydraulic cylinder 62 and the inner arm member 26 to move outwardly from the point of pivotal attachment between the hydraulic cylinder 62 and the outer arm member 24. As this motion occurs, the inner 26 and outer 24 arm members move apart in a scissor-like motion upon the pivot point 36. During a first portion of this motion, the room 2 interior side is supported at its lower edge by the bearing or roller 74 in a horizontal region 76 of the track 72 that is mounted within the vehicle 4. The room 2 is further supported by the tension cables 70 that are anchored to the vehicle 4, extend over a curved wall portion of the outer arm anchor 68 and generally along the outer arm member 24, and are anchored to the room-supporting inner arm 26 generally below the end cap 42.

When the room reaches a selected point in its extension, the bearing or roller 74 moves into a descending region 78 of the track 72. In order to maintain the cables 70 under tension, while at the same time allowing the room outer side wall 10 to drop in concert with the roller or bearing 74 and to generally maintain the room with its floor 12 parallel to the vehicle floor 6, and to allow the pivotal connection of the inner 26 and outer 24 arm members to accommodate the vertical movement of the room 2 and inner arm 26 relative to the vehicle 4, the elongated opening 38 in the outer arm member 26 allows the pivot pin 38 to shift relative to the outer arm 24. During this shift, the arm member bearing or roller 54 transitions from the cam surface room upright portion 50 to the cam surface room drop portion 52. Room retraction, of course forces the described elements through the reverse pattern as the force assist element 62 retracts rather than expands.

Because the housing 80 control bar 86 is pivotally attached to the inner arm member 26 movement of the inner arm member relative to the vehicle causes the housing 80 to be pulled outward (during room extension) and pushed inward (during room retraction). The housing end wall 82 preferably spans the housing side walls 84 at the top and interior edges of the housing side walls 84. An opening between the side walls therefore faces the hydraulic cylinder 62 and outer arm member 24. As the housing is pulled or pushed over the low friction support surface 86, the housing is therefore able to move over and cover the hydraulic cylinder 62 and exposed portions of the outer arm member 24. In this manner, the portions of the mechanical room control system that might otherwise protrude from designed concealment structures (such as built-in furniture, storage units, or wall panels) are aesthetically enclosed.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is:

1. A support vehicle expandable room and control mechanism for maintaining and moving a first expandable room member between a first location above a second member to a second location beside and generally horizontally aligned with said second vehicle member, said support and control mechanism comprising:

a first member of the expandable room having a first end and a second end, said first member having a guide combined therewith generally near said first member first end;

a second member of the vehicle having a track combined therewith, said track being adapted to receive said guide and said track comprising a generally descending portion;

a first arm pivotally combined with said second member;

a second arm pivotally combined with said first member generally near said first member second end, said second arm being pivotally combined with said first arm;

a line being anchored with said second member and being anchored with said second arm, said line extending generally along said first arm;

a force assist element for moving said first and second arms relative to one another to cause the guide to move along the track.

2. The support and control mechanism of claim 1 wherein: the force assist element is a hydraulic cylinder.

3. The support and control mechanism of claim 2 wherein: the hydraulic cylinder comprises a cylinder body and an extension rod wherein the cylinder body is pivotally attached to the first arm and the extension rod is pivotally attached to the second arm.

4. The support and control mechanism of claim 1 wherein: the first and second arms are pivotally combined with one another in a cammed relationship.

5. The support and control mechanism of claim 1 further comprising:

a pivot pin pivotally connecting said first and second arms.

6. The support and control mechanism of claim 5 further comprising:

an arm end cap journalled upon said pivot pin, said end cap having a contoured cam surface thereon.

7. The support and control mechanism of claim 6 further comprising:

an arm bearing extending from the second arm and making load bearing contact with the contoured cam surface.

8. The support and control mechanism of claim 7 wherein the arm bearing is a roller.

9. The support and control mechanism of claim 7 wherein:

the first arm has an elongated opening formed therein, said elongated opening receiving the pivot pin and said pivot pin being slideable therein, said first arm being an outer arm and said first arm having said second arm nested moveably therein, said second arm having an opening formed therein for receiving said pivot pin, said end cap having an opening formed therein and said end cap being journalled on said pivot pin between said first and second arms, said end cap contoured cam surface being shaped to allow the arm bearing to remain in load bearing contact with the contoured cam surface as the pivot pin slides in the first arm elongated opening.

10. The support and control mechanism of claim 1 further comprising:

a housing having an opening formed therein, said housing being disposed to selectively receive said first arm and force assist element within said opening.

11. The support and control mechanism of claim 10 further comprising:

a low friction support surface combined with the first member and moveable relative to the second member, said low friction support surface being disposed beneath said housing.

12. The support and control mechanism of claim 10 further comprising:

a connecting member extending between said housing and said second arm.

13. A vehicle expandable room mechanism for selectively moving an expandable room portion from a first position substantially within a vehicle to a second position extending from said vehicle, said mechanism comprising:

an expandable room member;

a vehicle member disposed below said expandable room member;

a first arm pivotally anchored with said vehicle member;

a second arm pivotally anchored with said expandable room member, said second arm being pivotally connected with said first arm;

a housing having an opening formed therein, said housing being disposed to selectively receive said first arm and force assist means within said opening.

14. The support and control mechanism of claim 13 further comprising:

a low friction support surface combined with the first member and moveable relative to the second member, said low friction support surface being disposed beneath said housing.

15. The support and control mechanism of claim 13 further comprising:

a connecting member extending between said housing and said second arm.

16. A vehicle expandable room support and control mechanism for maintaining and moving a first member between a first location above a second vehicle member to a second location beside and generally horizontally aligned with said second member, said support and control mechanism comprising:

an expandable room member having an interior end and an exterior end, said expandable room member having a guide combined therewith generally near said expandable room member interior end;

a vehicle member having a track combined therewith, said track being adapted to receive said guide and said track comprising a generally descending portion;

an outer arm having an outer arm top portion and an outer arm bottom portion, said outer arm bottom portion being pivotally anchored to said vehicle member and said outer arm top portion having an elongated opening formed therein;

an inner arm having an inner arm top portion and an inner arm bottom portion, said inner arm bottom portion being pivotally anchored to said expandable room member generally near said exterior end, said inner arm top portion having an opening formed therein;

a pivot pin extending through said outer arm top portion elongated opening and said inner arm top portion opening, said pivot pin pivotally combining said inner arm and outer arm in nested arrangement wherein said inner arm is selectively disposed interior to said outer arm;

an end cap being comprising parallel end cap side walls, each side wall having an opening formed therein and each side wall being journalled upon said pivot pin between said inner arm and said outer arm, said end cap further comprising an end wall disposed generally perpendicular to said side walls and above said inner and outer arms, said end cap side walls having a contoured lower edge;

a pair of parallel bearings extending from said outer arm top portion and engaging said end cap side wall contoured lower edge;

a line being anchored with said vehicle member and being anchored with said second arm, said line extending generally along said first arm;

a force assist element for moving said first and second arms relative to one another to cause the guide to move along the track;

said end cap further comprising an end cap stop extending generally downwardly from said end cap end wall;

an adjustment element extending generally upwardly from said inner arm top portion, said adjustment element being disposed to allow the selective adjustment of the inner arm relative to the end cap stop.

* * * * *